US006968304B2

(12) United States Patent
Zhang et al.

(10) Patent No.: US 6,968,304 B2
(45) Date of Patent: Nov. 22, 2005

(54) CALCULATION OF RADIATION EMITTED BY A COMPUTER SYSTEM

(75) Inventors: Lan Zhang, Austin, TX (US); Ray Wang, Austin, TX (US)

(73) Assignee: Dell Products L.P., Round Rock, TX (US)

(*) Notice: Subject to any disclaimer, the term of this patent is extended or adjusted under 35 U.S.C. 154(b) by 799 days.

(21) Appl. No.: 09/768,083

(22) Filed: Jan. 23, 2001

(65) Prior Publication Data

US 2002/0138239 A1 Sep. 26, 2002

(51) Int. Cl.$^7$ ............................................. G06F 17/50
(52) U.S. Cl. ..................................................... 703/13
(58) Field of Search .......................... 703/13, 2; 702/66, 702/65; 257/718; 361/704, 709; 342/417, 357.04, 350; 219/535; 343/765; 455/424, 226.1; 324/627

(56) References Cited

U.S. PATENT DOCUMENTS

| | | | | |
|---|---|---|---|---|
| 5,591,368 A | * | 1/1997 | Fleischhauer et al. | 219/535 |
| 5,804,875 A | * | 9/1998 | Remsburg et al. | 257/718 |
| 6,282,095 B1 | * | 8/2001 | Houghton et al. | 361/704 |
| 6,664,463 B1 | * | 12/2003 | Treiber et al. | 174/35 GC |
| 2002/0018338 A1 | * | 2/2002 | McCullough | 361/709 |
| 2002/0089449 A1 | * | 7/2002 | Fox | 342/417 |
| 2002/0099510 A1 | * | 7/2002 | Namiki | 702/66 |

OTHER PUBLICATIONS

Visser et al., "Minimization of heat sink mass using Mathematical optimisation", IEEE 2000.*
Zhang, Lan; A Thesis Presented to the Faculty of the Graduate School of the University of Missouri–Rolla entitled "Detection Of Smart Landmines Through EMI Signatures And FDTD Modeling"; 1999; 89 pages.
U.S. Patent Application entitled "Method And Apparatus For Reducing EMI Radiation In A Computer System"; Richard N. Worley, Steve L. Williams, Leroy Jones Jr.; 17 pages.

* cited by examiner

Primary Examiner—Kevin J. Teska
Assistant Examiner—Kandasamy Thangavelu
(74) Attorney, Agent, or Firm—Haynes and Boone, LLP (57) ABSTRACT

The disclosure relates to a method for calculating electromagnetic radiation emitted by a computer system. The method models the characteristic radiation from a central processing unit as a modulated Gaussian pulse. The method solves Maxwell's equation using finite differences in the time domain. After solving Maxwell's equation the method determines if the radiation emitted by the heat sink is capacitively coupled to the radiation emitted by the remaining components of the computer system. The method also determines whether radiation emitted by the heat sink is inductively coupled to the radiation emitted by the remaining components of the computer system. Finally, the method uses a fast Fourier transform to translate time domain data to the frequency domain. The method also teaches using a computer system, with instructions coded on a computer readable medium to make the calculations described.

6 Claims, 6 Drawing Sheets

NO FIN, NO TOP

Case A

3 FINS, NO TOP

Case B

25 FINS, NO TOP

Case C

25 FINS, 2 TOP BARS

Case D

CALCULATION OF RADIATION EMITTED BY A COMPUTER SYSTEM

BACKGROUND

This patent application relates to calculating and reducing electromagnetic radiation at varying distances from computer and data processing systems.

Computer systems in general and personal computer systems in particular have attained widespread use within many segments of today's society. A personal computer system can usually be defined as a desktop, floor standing, or portable microcomputer that includes a system processor, memory, a display monitor, a keyboard, one or more diskette drives and a fixed disk storage device.

Computer systems are electronic information handling systems which can be designed to give independent computing power to one user or a plurality of users. A personal computer may also include one or a plurality of peripheral devices which are coupled to the system processor and which perform specialized functions. Examples of peripheral devices include modems, sound and video devices and specialized communication devices. Mass storage devices such as hard disks, CD-ROM drives and magneto-optical drives are also considered to be peripheral devices.

Personal computer system components such as integrated circuits are typically mounted on or integrated within printed circuit boards. During operation of a data processing system having one or more printed circuit boards, the system components cause electric currents to be generated on or in the printed circuit boards and associated components. Such electric currents often result in electromagnetic energy being radiated which can interfere with system operation.

Radiated electromagnetic energy has the capacity to do work (e.g., moving a molecule, such as when a microwave oven heats food by using radiated electromagnetic energy, or causing electromagnetic interference (EMI) in other electronic devices). Accordingly, for a variety of reasons, governmental bodies often enact laws placing limits on radiated electromagnetic energy. Because EMI is of great concern in the industry, such government standards typically limit the measured electric field strength a known distance from the system generating the field.

Accordingly, efforts are made within the industry to limit the EMI generated by a system. But limiting generated EMI requires an estimate of the radiation for a specific system configuration. After the radiation level is known, reconfiguring the system may reduce the amount of EMI. A method is needed to predict radiation generated by a particular system at a fixed distance from the system. The present disclosure addresses this need.

SUMMARY

The disclosure relates to a method for calculating radiation ("noise") emitted by a computer system. The disclosure relates to a method for calculating electromagnetic radiation. The method models the characteristic radiation from a central processing unit as a modulated Gaussian pulse. The method solves Maxwell's equation using finite differences in the time domain. After solving Maxwell's equation the method determines if the radiation emitted by the heat sink is capacitively coupled to the radiation emitted by the remaining components of the computer system. The method also determines whether radiation emitted by the heat sink is inductively coupled to the radiation emitted by the remaining components of the computer system. Finally, the method uses a fast Fourier transform to translate time domain data to the frequency domain. The method also teaches using a computer system, with instructions coded on a computer readable medium to make the calculations described.

BRIEF DESCRIPTION OF THE DRAWINGS

The present disclosure may be better understood, and its numerous objects, features, and advantages made apparent to those skilled in the art by referencing the accompanying drawings.

FIG. 1A-1 and FIG. 1A-2 are flow diagram of a method to predict the electromagnetic radiation produced by a computer system or data processing system.

The use of the same reference symbols in different drawings indicates identical items unless otherwise noted.

DETAILED DESCRIPTION

The following sets forth a detailed description of a mode for carrying out the disclosure. The description is intended to be illustrative of the disclosure and should not be taken to be limiting.

Input to the program can be divided into 3 categories; information regarding the location of the CPU with respect to the heat sink, heat sink fin geometry and an applied modulated Gaussian pulse simulating the radiation characteristics of the CPU.

Figure 1A:
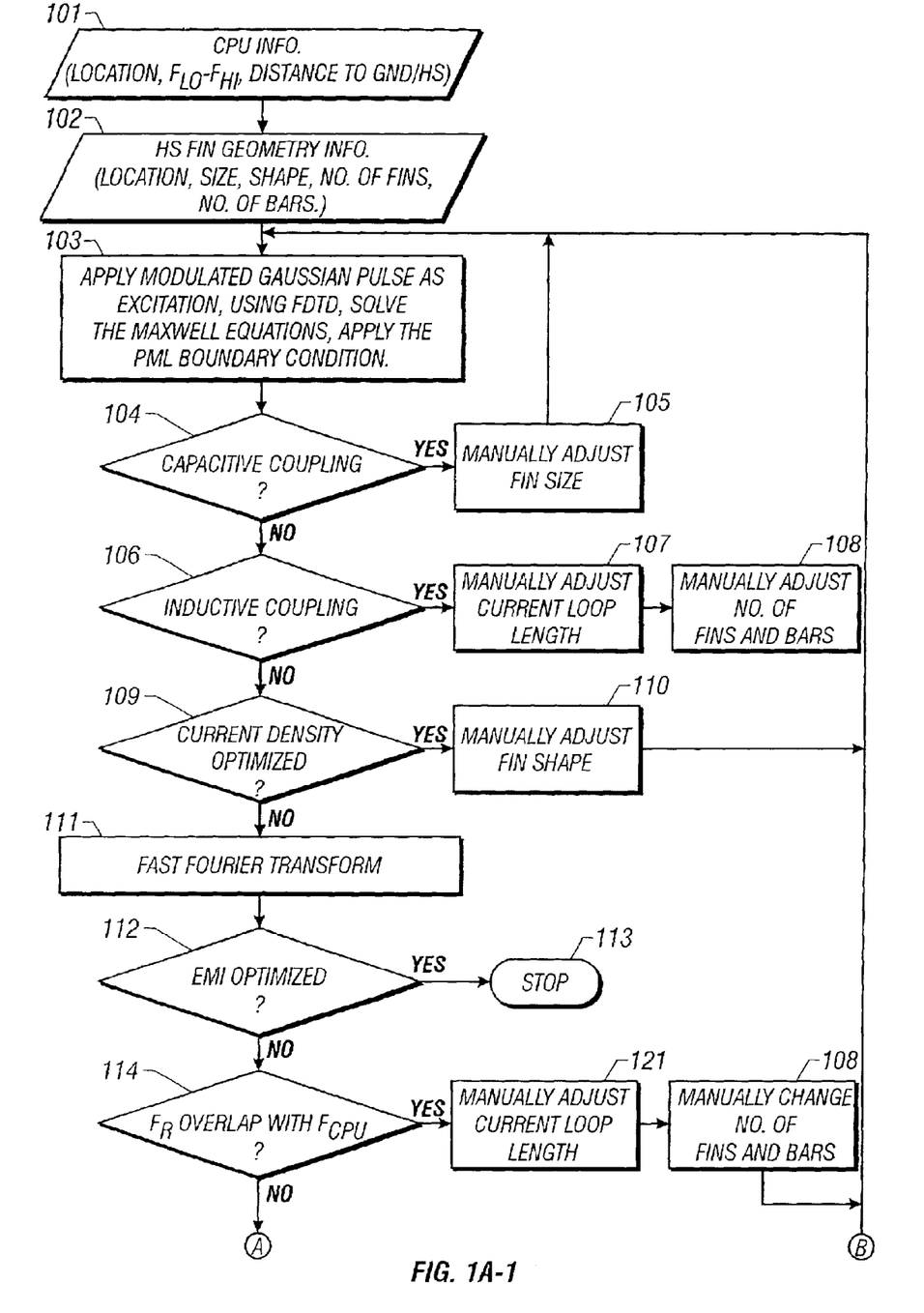

Referring to FIG. 1A-1, data from the first category, CPU information, is represented by logical step 101. Logical step 101 allows input of the CPU into a computer program. CPU information includes the horizontal and vertical distances from the heat sink to the CPU. CPU information also includes the distance from the CPU to the ground. Finally, CPU information includes the frequency range of the radiation noise emitted from the CPU and is denoted $f_{hi}$ (frequency–high)–$f_{low}$(frequency low) The program will also consider a second set of parameters for a CPU. A second set of parameters allows the program to calculate the radiation produced by a single computer having two CPUs, sometimes referred to as a multiprocessor.

The second category of data includes the physical characteristics of the heat sink and is input into the computer program in logical step 102. Data from the second category includes heat fin geometry. Specifically the size, shape, location and number of fins on the heat sink are inputs to the program. Finally, in the number of bars of each heat sink is included in this, the second data category. (Note, a fin is a vertically oriented radiating surface, a bar is a horizontally oriented radiating surface.)

In its first calculation, logical step 103, the program applies a modulated Gaussian pulse as excitation. The program uses finite differences in the time domain (FDTD) to solve Maxwell's equation. Maxwell's equation provides a method to predict the electromagnetic wave in 3 dimensions. Solving Maxwell's equation with the variables input in logical steps 101 and 102 provides an estimate of the electronic field and magnetic field distribution. In logical step 103, based on the electronic and magnetic fields as predicted by Maxwell's equation, the program extrapolates radiation produced by the CPU at specific distances, the desired output.

FDTD is used to solve Maxwell's equation, a differential equation. FDTD is a direct second-order discretization of Maxwell's curl equations. The FDTD algorithm solves for the electric and magnetic fields using a large number of finite differences in time and space instead of solving for the fields using a wave equation. The electrical fields and the magnetic fields are each calculated for each discrete time interval. Similarly the electrical field and the magnetic field are calculated for each 3 dimensional increment of space. Using incremental distances and steps in time allows the computer to calculate a solution for the differential equation without completing the integration. Assuming a linear, isotropic, non-dispersing, source free and lossless materials, Maxwell's equation is represented by:

$$\nabla \times \vec{E} = -\mu \frac{\partial \vec{H}}{\partial t} \quad \text{(Equation 1)}$$

$$\nabla \times \vec{H} = \varepsilon \frac{\partial \vec{E}}{\partial t} \quad \text{(Equation 2)}$$

Referring to Equations 1 and 2, $\vec{E}$ and $\vec{H}$ are the electric and magnetic field, and $\mu$ and $\varepsilon$ are the materials permittivity and permeability, respectively. Equation 1 and Equation 2 can be represented by six scalar equations in Cartesian coordinates. The scalar equations are solved in discrete increments with respect to the time and space. The discrete increments are determined according to second-order central differencing method. Maxwell's equation using discrete elements to solve the electric field is:

$$E_x^{n+1}(i, j, k) = \quad \text{Equation 3.1}$$
$$E_x^n(i, j, k) + \frac{\Delta t}{\varepsilon \Delta y}\left[H_z^{n+\frac{1}{2}}(i, j, k) - H_z^{n+\frac{1}{2}}(i, j-1, k)\right] -$$
$$\frac{\Delta t}{\varepsilon \Delta z}\left[H_z^{n+\frac{1}{2}}(i, j, k) - H_z^{n+\frac{1}{2}}(i, j, k-1)\right]$$

Maxwell's equation using discrete elements to solve the magnetic field is:

$$H_x^{n+\frac{1}{2}}(i, j, k) = \quad \text{Equation 3.2}$$
$$H_x^{n-\frac{1}{2}}(i, j, k) + \frac{\Delta t}{\mu \Delta z}[E_y^n(i, j, k) - E_y^n(i, j, k)] -$$
$$\frac{\Delta t}{\mu \Delta y}[E_z^n(i, j+1, k) - E_z^n(i, j, k)]$$

The definition of the modulated Gaussian pulse is given in Equation 4, below:

$$F_s(f) = \frac{\sqrt{\pi}}{2\alpha} e^{-j2\pi f t_0}\left(e^{-\left[\frac{\pi(f-f_0)}{\alpha}\right]^2} + e^{-\left[\frac{\pi(f+f_0)}{\alpha}\right]^2}\right) \quad \text{Equation 4}$$

wherein $f_0$ is the center frequency and has value of $$\frac{f_{hi} + f_{lo}}{2},$$

in which $f_{hi}$ is the starting frequency and $f_{lo}$ is the ending frequency. And $\alpha$ and $t_0$ are $$\alpha = \pi \frac{(f_{hi} - f_{lo})}{2\sqrt{-\ln b_{BW}}} \quad \text{Equation 5}$$

$$t_0 = \frac{1}{\alpha}\sqrt{-\ln b_t} \quad \text{Equation 6}$$

Referring to Equation 5, $b_{BW}$ is the minimum pulse at t=0. According to the present method, $b_{BW}$ is set equal to 0.0001. Referring to Equation 6, $b_t$ is the maximum Gausian pulse level at t=0. According to the present method, and $b_t$ is set equal to 0.001. The frequency range must satisfy Nyquist's law. Therefore, the upper threshhold of the frequency bandwidth of the modulated Gaussian pulse is determined by:

$$f_0 \geq \frac{\alpha}{\pi}\sqrt{-\ln(b_f)}, \quad \text{Equation 7}$$

Referring to Equation 7, $bf$ is the maximum component in the Gaussian pulse, and in this method, is set equal to 0.001.

Referring again to FIG. 1A-1, Event 104 determines whether capacitive coupling exists between the heat sink and central processing unit. Capacitive coupling represents the radiation noise propagated through electronic field energy. A heat sink with a large surface area will induce electronic noise through capacitive coupling with another source of noise, for example a clock, a central processing unit or a second CPU. Capacitance is proportional to surface area, therefore, a heat sink with a larger surface area stores more electrical energy and has a larger capacitance.

Similarly, a large current loop will produce magnetic noise through inductance. Logical step 106 determines if inductive coupling exists between the heat sink and a source of noise such as a central processing unit. The size of the loop is defined by the path taken by the current over the surface of the heat sink induced by the electromagnetic field. The current loop produces a magnetic flux within the surface area bounded by the loop. A larger loop produces a larger inductance and a stronger magnetic coupling Again, inductive noise is produced by coupling noise with a source such as a clock or central processing unit. As above, the inductive coupling of the noise to the heat sink propagates noise. (Note, generally "noise" refers to radiation within the computer and "radiation" refers to electromagnetic energy in the field external to the computer.)

In logical step 109, the process determines if the current density is acceptable. Current density depends on the location of input/out put devices (I/O devices) and cables. Certain I/O devices (for example, audio chips, video cards and busses) in close proximity to cables carrying certain signals will cause concentrations of current which will emit noise at unacceptably high levels. (For example printer, monitor and scanner cables may propagate radiation noise incident to the I/O devices.) This noise emission is reduced by increasing the separation between the high noise area and the I/O devices and cables. If the current density distribution is not acceptable, the fin shape can be changed with new parameters input manually. The program returns to Maxwell's equation, logical step 103, and begins again.

If, in logical step 109, the program determines the current density is optimized, the program continues to logical step 111. Logical step 111 calls a fast Fourier transform (FFT) which transforms the FDTD results from a time domain into a frequency domain. If the electromagnetic interference (EMI) is optimized then the program proceeds to logical step 114. Logical step 114 determines if the range of the magnetic resonance of the cpu ($f_{cpu}$) includes the magnetic resonance of the heat sin ($f_r$). If $f_r$ falls within the range defined by $f_{cpu}$ then the program continues to logical step 121, and the program accepts a manual adjustment to the current loop length. Adding fins to the heat sink increases the loop length due to the lengthened path the current follows along the added fins. The current loop length is decreased by adding bars to the heat exchanger. Adding bars provides an alternate path for the current, thus decreasing the current path.

After manually adjusting the current loop length the program proceeds to logical step 108 and changes the number of fins and the number of bars. After changing (by manual input) the number of fins and bars the program returns to logical step 103 and again solves Maxwell's equation.

Figure 1A:
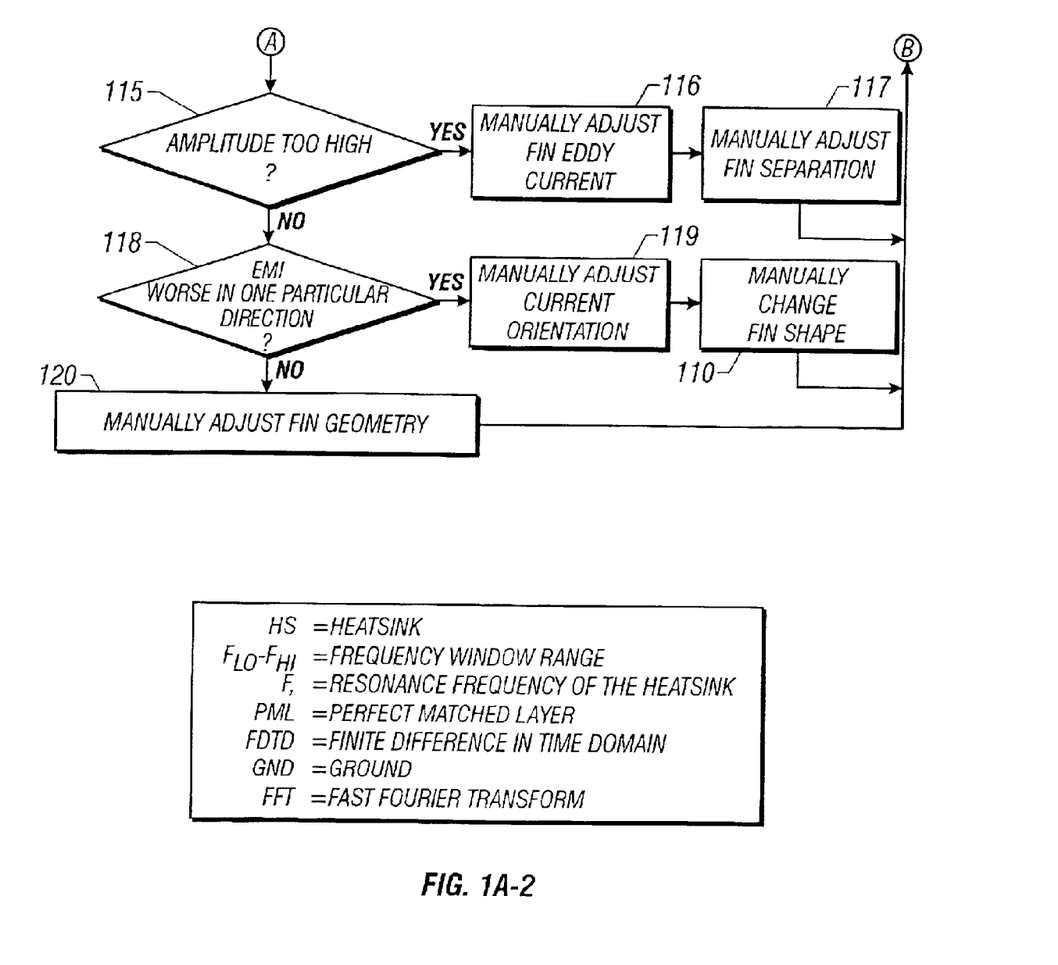

Referring now to FIG. 1A-2, if $f_r$ is not found within the range defined by $f_{cpu}$, then the program proceeds to logical step 115. Logical step 115 determines if the amplitude of the electromagnetic field exceeds a predetermined level. (In one embodiment, the predetermined level is the maximum allowable level of radiation as permitted by a governing body.) If the amplitude exceeds the predetermined limit then the program accepts an adjustment to the eddy current manually input. After changing the eddy current according to a manual input the program also accepts a manual input into the separation of the fins, logical step 117.

Those of skill in the art will recognize that, based upon the teachings herein, several modifications may be made to the embodiments shown in FIG. 1A-1, FIG. 1A-2 and FIG. 1B. For example, steps 104, 106 and 109 may be omitted as discussed below.

AN EMBODIMENT OF THE INVENTION

Figure 1B:
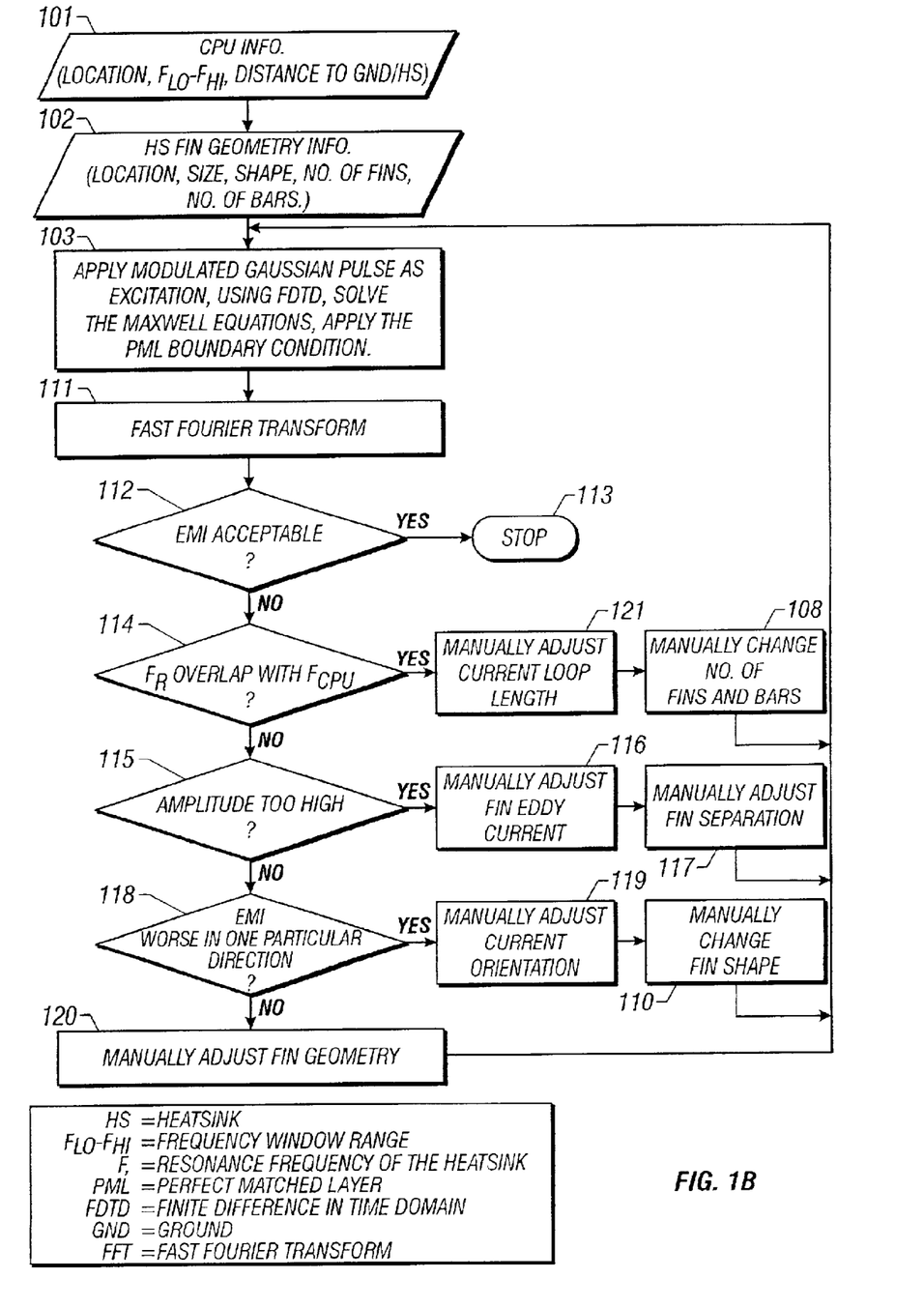
FIG. 1B depicts a flow diagram of a prediction of the electromagnetic radiation for the frequency domain only.

An embodiment of the disclosure omits steps 104, 106 and 109 from the process. Current EMI test methods specify EMI levels in the frequency domain only. As described above, the disclosure may be used to determine if capacitive and inductive coupling exists. After determining if capacitive and inductive coupling exists the present disclosure may be practiced but limited to the frequency domain. (Analysis in the time domain is omitted.) As shown in FIG. 1B, the process begins again with the same 2 sets of variables as shown previously in FIG. 1A-1: cpu information, logical step 101 and heat sink fin geometry information, logical step 102.

As in FIG. 1 before, the process continues to a fast Fourier transform (FFT) as represented by logical step 111. In this embodiment, fast Fourier transfers data only from the time domain to the frequency domain. In this embodiment, the time domain analysis is omitted. The analysis is completed in the frequency domain only. After solving the transforming data using the fast Fourier transform, logical step 111, the confirms that the electromagnetic interference is at an acceptable level, logical step 112. If the electromagnetic interference is at an acceptable level, the process stops, logical step 130.

If the electromagnetic interference is not at an acceptable level, the process determines if $f_r$ is within the range defined by $f_{cpu}$. If $f_r$ is not within the range defined by $f_{cpu}$, then manual adjustments are again made to the physical parameters (logical steps 121 and 108). If $f_r$ is within the range defined by $f_{cpu}$, the program determines if the amplitude of the electromagnetic interference is within acceptable levels, logical step 115. If the amplitude is not within acceptable levels, manual adjustments are again made to the fin Eddy current, logical step 116 and fin separation, logical step 117. If the amplitude of the electromagnetic interference is within an acceptable level, the program determines if the electromagnetic interference increases unacceptably in any specific direction, logical step 118. If the electromagnetic interference increases unacceptably in a particular direction, the current orientation is changed in logical step 119 and the fin shape is also changed, logical step 110. (Note, logical steps 110 and 119 are manual steps). If the electromagnetic interference is not worse in a particular direction, the process accepts a manual adjustment to the fin geometry.

Figure 2:
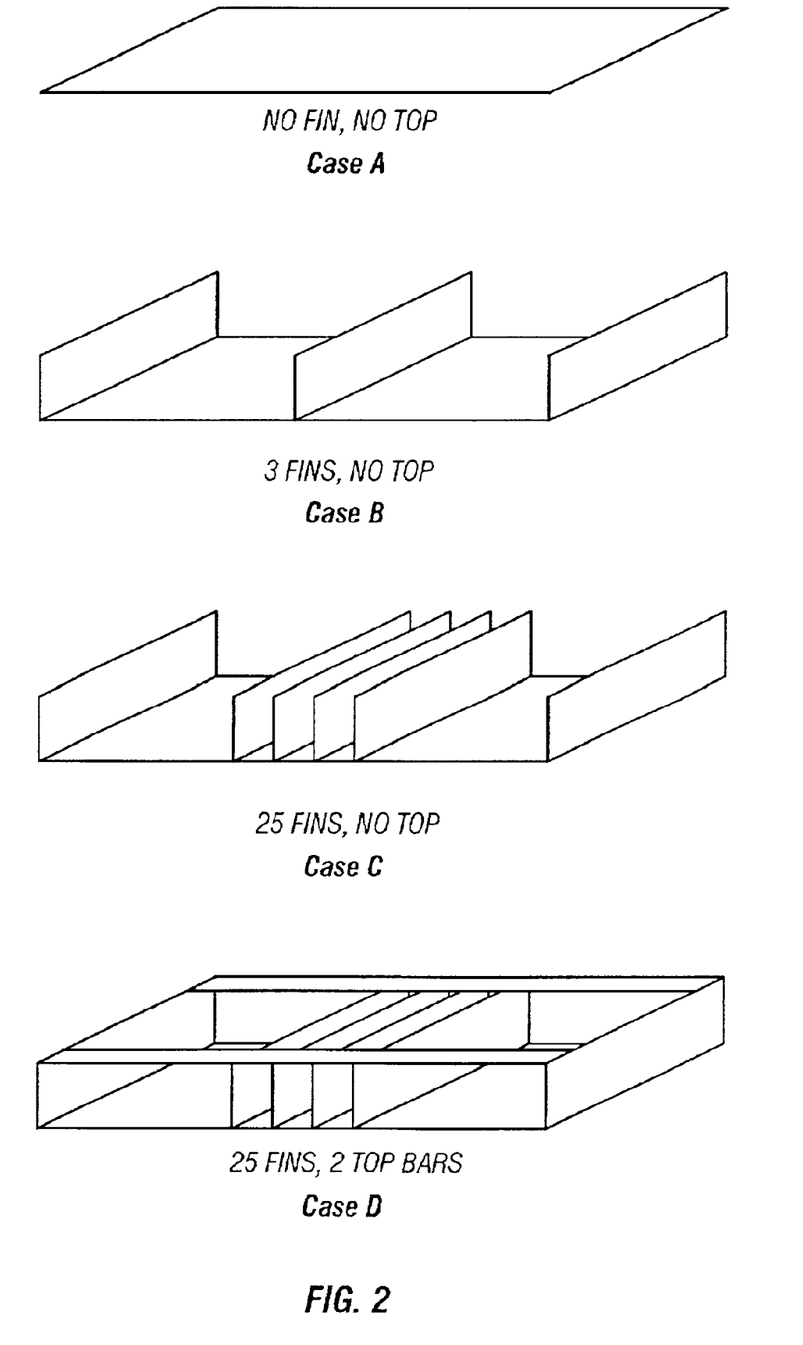
FIG. 2 is depicts various configurations of fins and bars for a heat exchanger.

FIG. 2 is an illustration of configurations of a heat sink. Case A illustrates a heat sink with no fins and no bars. Case B illustrates a heat sink with 3 fins and no bars. Case 4 illustrates a heat sink with 25 fins and no bars. And Case D illustrates a heat sink with 25 fins and 2 bars.

Figure 3:
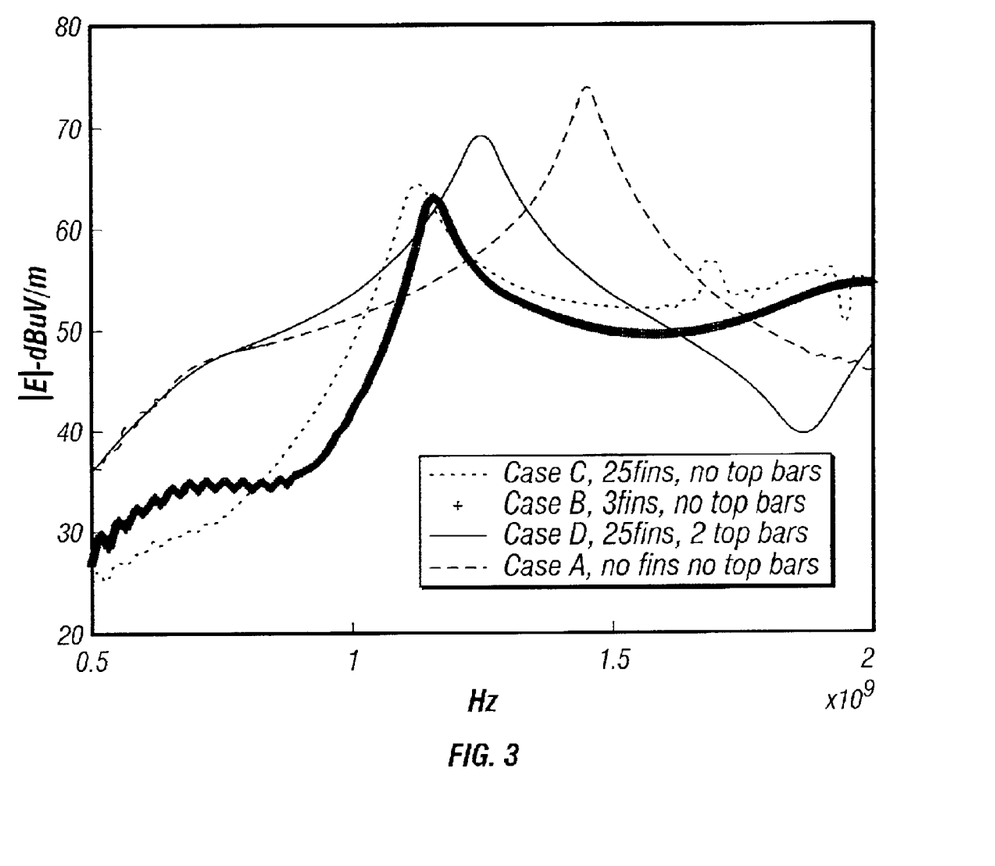
FIG. 3 is a graphical depiction of the electromagnetic interference produced by a specific system using the combinations of fins and bars depicted in FIG. 2.

FIG. 3 is a graphical representation of the product of the computer program. The x,y graph represents electromagnetic interference versus frequency. The maximum electromagnetic value, shown at the maximum value on the X-axis, is referred to as the resonance frequency. This plot represents the combination of fins and bars as Cases A, B, C and D as shown in FIG. 2.

Figure 4:
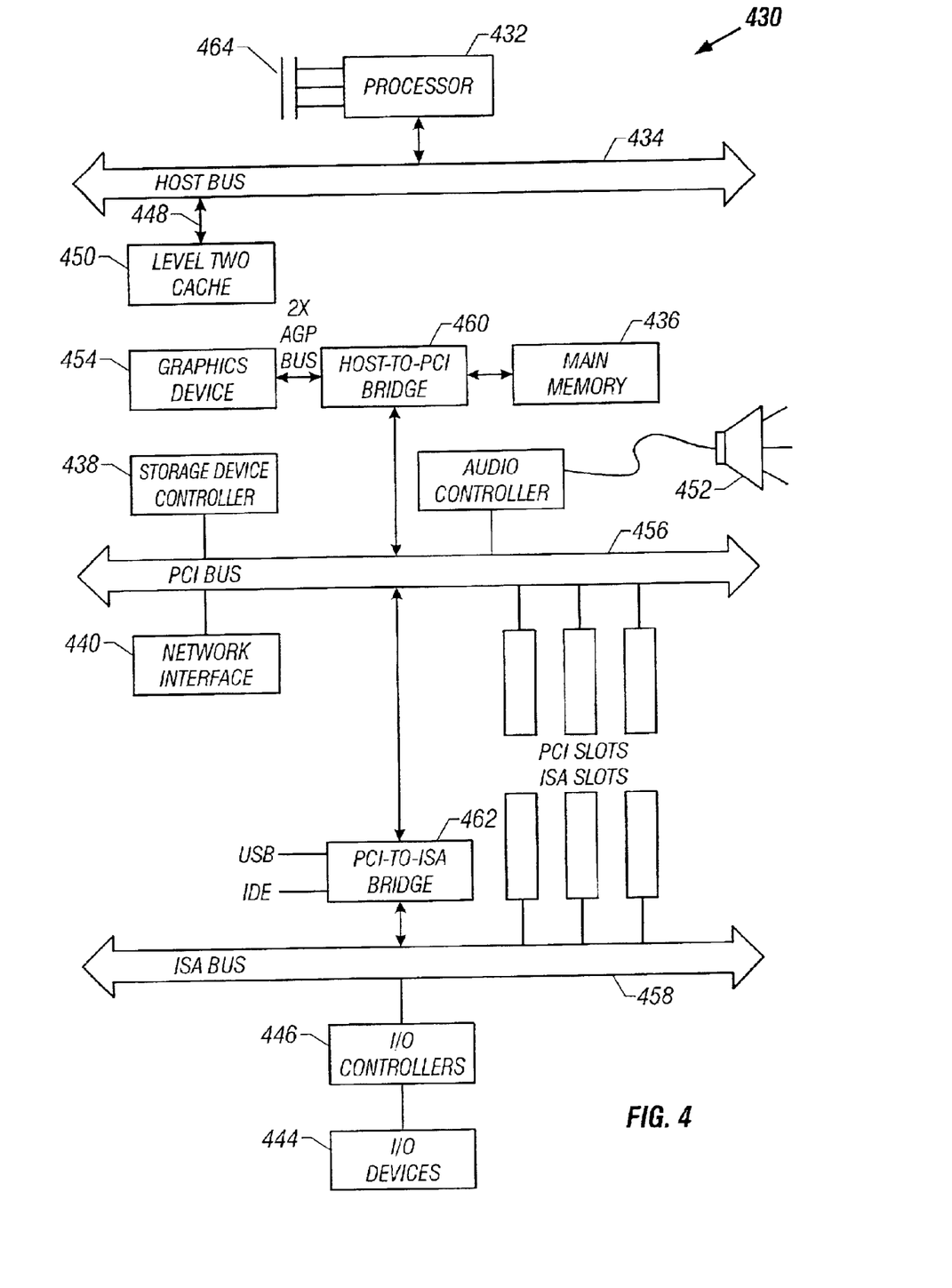
FIG. 4 is a line diagram of a typical computer system for which the electromagnetic radiation can be calculated by the present disclosure.

The present disclosure may be used to calculate the electromagnetic interference generated by a computer system as shown in FIG. 4. Computer system 430 includes central processing unit (CPU) 432 connected by host bus 434 to various components including main memory 436, storage device controller 438, network interface 440, audio and video controllers 442, and input/output devices 444 connected via input/output (I/O) controllers 446. Heat sink 464 is located adjacent to CPU 432 as shown. Those skilled in the art will appreciate that this system encompasses all types of computer systems including, for example, mainframes, minicomputers, workstations, servers, personal computers, Internet terminals, network appliances, notebooks, palm tops, personal digital assistants, and embedded systems.

Typically computer system 430 also includes cache memory 450 to facilitate quicker access between processor 432 and main memory 436. I/O peripheral devices often include speaker systems 452, graphics devices 454, and other I/O devices 444 such as display monitors, keyboards, mouse-type input devices, floppy and hard disk drives, DVD drives, CD-ROM drives, and printers. Many computer systems also include network capability, terminal devices, modems, televisions, sound devices, voice recognition devices, electronic pen devices, and mass storage devices such as tape drives. The number of devices available to add to personal computer systems continues to grow, however computer system 430 may include fewer components than shown in FIG. 4 and described herein. The peripheral devices usually communicate with processor 432 over one or more buses 434, 456, 458, with the buses communicating with each other through the use of one or more bridges 460, 462.

One skilled in the art will recognize that the foregoing components and devices are used as examples for sake of conceptual clarity and that various configuration modifications are common.

While particular embodiments of the present disclosure have been shown and described, it will be recognized to those skilled in the art that, based upon the teachings herein, further changes and modifications may be made without departing from this disclosure and its broader aspects, and thus, the appended claims are to encompass within their scope all such changes and modifications as are within the true spirit and scope of this disclosure.

What is claimed is:

1. A computer implemented method for calculating electromagnetic radiation in a computer system, comprising:
   determining the distance of a central processing unit from a heat sink;
   determining a number of fins and a number of bars of the heat sink;
   determining the heat sink fin geometry;
   determining if the capacitive coupling exists between the heat sink and the central processing unit for adjusting the fin size;
   determining if inductive coupling exists between the heat sink and the central processing unit for adjusting the number of fins and a number of bars;

determining the current density across the heat sink for adjusting the fin geometry;

determining current loop length defined by a current path over a surface of the heat sink and adjusting the current loop length by adjusting one or more of the number of fins, the number of bars and the fin geometry;

modeling characteristic radiation from the central processing unit as a modulated Gaussian pulse; and estimating the electromagnetic field produced by the central processing unit using finite differences in time domain (FDTD) to solve Maxwell's equation.

2. The method as recited in claim 1, further comprising:

reducing radiation noise by reducing capacitive coupling between the heat sink and the central processing unit.

3. The method as recited in claim 1, further comprising:

reducing radiation noise by reducing inductive coupling between the heat sink and the central processing unit.

4. A computer implemented method of designing a heat sink for a computer system, comprising:

determining the distance of a central processing unit from a heat sink;

determining a number of fins and a number of bars of the heat sink;

determining the heat sink fin geometry;

determining if the capacitive coupling exists between the heat sink and the central processing unit for adjusting the fin size;

determining if inductive coupling exists between the heat sink and the central processing unit for adjusting the number of fins and a number of bars;

determining the current density across the heat sink for adjusting the fin geometry;

determining current loop length defined by a current path over a surface of the heat sink and adjusting the current loop length by adjusting one or more of the number of fins, the number of bars and the fin geometry;

modeling the characteristic radiation from the central processing unit as a modulated Gaussian pulse;

estimating the electromagnetic fields produced by the central processing unit using finite differences in the time domain (FDTD) to solve Maxwell's equation;

using a fast Fourier transform to translate time domain data to frequency domain;

reducing radiation noise by reducing capacitive coupling between the heat sink and the central processing unit;

reducing radiation noise by reducing inductive coupling between the heat sink and the central processing unit; and designing the heat sink with adjusted number of fins, number of bars and fin geometry.

5. A computer program product in a computer readable medium, comprising computer executable instructions, which when executed by a computer perform a process for designing a heat sink for a computer system, the said process comprising:

determining the distance of a central processing unit from a heat sink;

determining a number of fins and a number of bars of the heat sink;

determining the heat sink fin geometry;

determining if the capacitive coupling exists between the heat sink and the central processing unit for adjusting the fin size;

determining if inductive coupling exists between the heat sink and the central processing unit for adjusting the number of fins and a number of bars;

determining the current density across the heat sink for adjusting the fin geometry;

determining current loop length defined by a current path over a surface of the heat sink and adjusting the current loop length by adjusting one or more of the number of fins, the number of bars and the fin geometry;

modeling characteristic radiation from the central processing unit as modulated Gaussian pulse;

estimating the electromagnetic field-produced by the central processing unit using finite differences in a time domain (FDTD) to solve Maxwell's equation;

using a fast Fourier transform to translate time domain data to frequency domain;

reducing radiation noise by reducing capacitive coupling between the heat sink and the central processing unit;

reducing radiation noise by reducing inductive coupling between the heat sink and the central processing unit; and designing the heat sink with adjusted number of fins, number of bars and fin geometry.

6. A computer apparatus for designing a heat sink for a computer system, wherein said computer system comprises:

a central processing unit, a heat sink coupled to the central processing unit, the heat sink having fins and bars, said apparatus comprising:

a processor unit for executing stored computer programs;

a memory unit for storing computer programs to be executed by the processor unit;

a computer program stored in the memory unit, comprising computer instructions, which when executed by the processor unit perform a process for designing a heat sink for said computer system, the said process comprising:

determining the distance of a central processing unit from a heat sink;

determining a number of fins and a number of bars of the heat sink;

determining the heat sink fin geometry;

determining if the capacitive coupling exists between the heat sink and the central processing unit for adjusting the fin size;

determining if inductive coupling exists between the heat sink and the central processing unit for adjusting the number of fins and a number of bars;

determining the current density across the heat sink for adjusting the fin geometry;

determining current loop length defined by a current path over a surface of the heat sink and adjusting the current loop length by adjusting one or more of the number of fins, the number of bars and the fin geometry;

modeling characteristic radiation from the central processing unit as a modulated Gaussian pulse;

estimating the electromagnetic fields produced by the central processing unit using finite differences in a time domain (FDTD) to solve Maxwell's equation;

using a fast Fourier transform to translate time domain data to frequency domain;

reducing radiation noise by reducing capacitive coupling between the heat sink and the central processing unit;

reducing radiation noise by reducing inductive coupling between the heat sink and the central processing unit; and designing the heat sink with adjusted number of fins, number of bars and fin geometry.

* * * * *